US012646886B2

(12) United States Patent
Stack

(10) Patent No.: US 12,646,886 B2
(45) Date of Patent: Jun. 2, 2026

(54) CONNECTOR WITH A DIELECTRIC SECURED IN A HOUSING

(71) Applicant: TE Connectivity Solutions GmbH, Schaffhausen (CH)

(72) Inventor: Daniel Stack, Winston Salem, NC (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 483 days.

(21) Appl. No.: 18/303,037

(22) Filed: Apr. 19, 2023

(65) Prior Publication Data

US 2024/0356278 A1 Oct. 24, 2024

(51) Int. Cl.

| | |
|---|---|
| ***H01R 13/62*** | (2006.01) |
| ***H01B 7/18*** | (2006.01) |
| ***H01R 13/627*** | (2006.01) |
| ***H01R 13/6583*** | (2011.01) |
| *H01R 13/6599* | (2011.01) |

(52) U.S. Cl.

CPC ....... *H01R 13/6271* (2013.01); *H01B 7/1865* (2013.01); *H01R 13/6583* (2013.01); *H01R 13/6599* (2013.01)

(58) Field of Classification Search

CPC ........................................................ H01R 12/53

USPC ............................ 439/595, 903, 585, 607.01

See application file for complete search history.

(56) References Cited

U.S. PATENT DOCUMENTS

| | | | | |
|---|---|---|---|---|
| 5,975,950 A * | 11/1999 | Yamaguchi .......... | H01R 9/0518 439/585 |
| 7,686,647 B1 * | 3/2010 | Hong ................. | H01R 13/5208 439/595 |

* cited by examiner

*Primary Examiner* — Phuong K Dinh

(57) ABSTRACT

A connector includes a dielectric having a body and a latching feature extending from the body, a shield disposed around the body of the dielectric, and a housing having a receiving passageway and a latch extending into the receiving passageway. The latching feature extends through the shield. The latch engages the latching feature of the dielectric to secure the dielectric and the shield in the receiving passageway of the housing.

20 Claims, 7 Drawing Sheets

CONNECTOR WITH A DIELECTRIC SECURED IN A HOUSING

FIELD OF THE INVENTION

The present invention relates to a connector and, more particularly, to a connector having a housing and a dielectric secured in the housing.

BACKGROUND

A connector commonly includes a housing and a dielectric with a shield disposed around the dielectric. The dielectric and shield are disposed in the housing and are secured in the housing by a latch of the housing. The dielectric is attached inside the shield and is indirectly held in the housing by a cantilevered arm of the latch, which directly engages the shield to hold the shield in place.

The attachment of the dielectric to the shield and the engagement of the shield with the latch, for example, has two separate positional tolerances. When the multiple positional tolerances of the assembled connector are added together, it becomes difficult to control an air gap between the dielectric and a mating dielectric of a mating connector, which negatively impacts signal integrity of the connector. Further, if a cable connected to the dielectric is subject to pull out forces, the indirect securing of the dielectric by the latch may not be sufficient to resist such forces, which could lead to disconnection and/or damage to the connector.

SUMMARY

A connector includes a dielectric having a body and a latching feature extending from the body, a shield disposed around the body of the dielectric, and a housing having a receiving passageway and a latch extending into the receiving passageway. The latching feature extends through the shield. The latch engages the latching feature of the dielectric to secure the dielectric and the shield in the receiving passageway of the housing.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
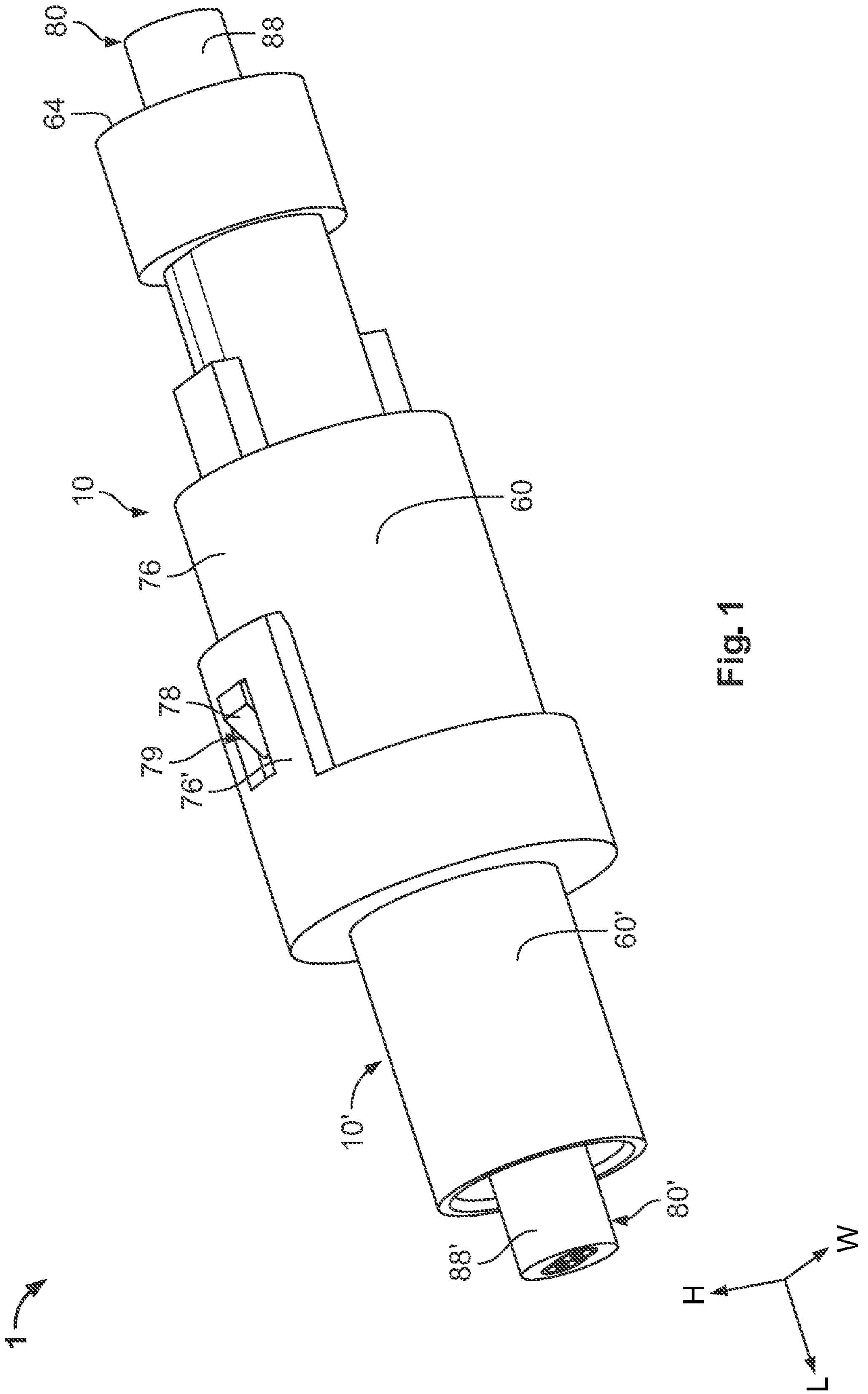
FIG. 1 is a perspective view of a connector system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "longitudinal direction", "height direction", and "width direction". These descriptors are merely for clarity of the description and for differentiation of the various directions. These directional descriptors do not imply or require any particular orientation of the disclosed elements.

A connector system 1 according to an embodiment, as shown in FIG. 1, includes a connector 10 and a mating connector 10' matable with the connector 10. The connector 10 will first be described in detail below, followed by the mating connector 10' and the mating of the connectors 10, 10' that forms the connector system 1.

Figure 2:
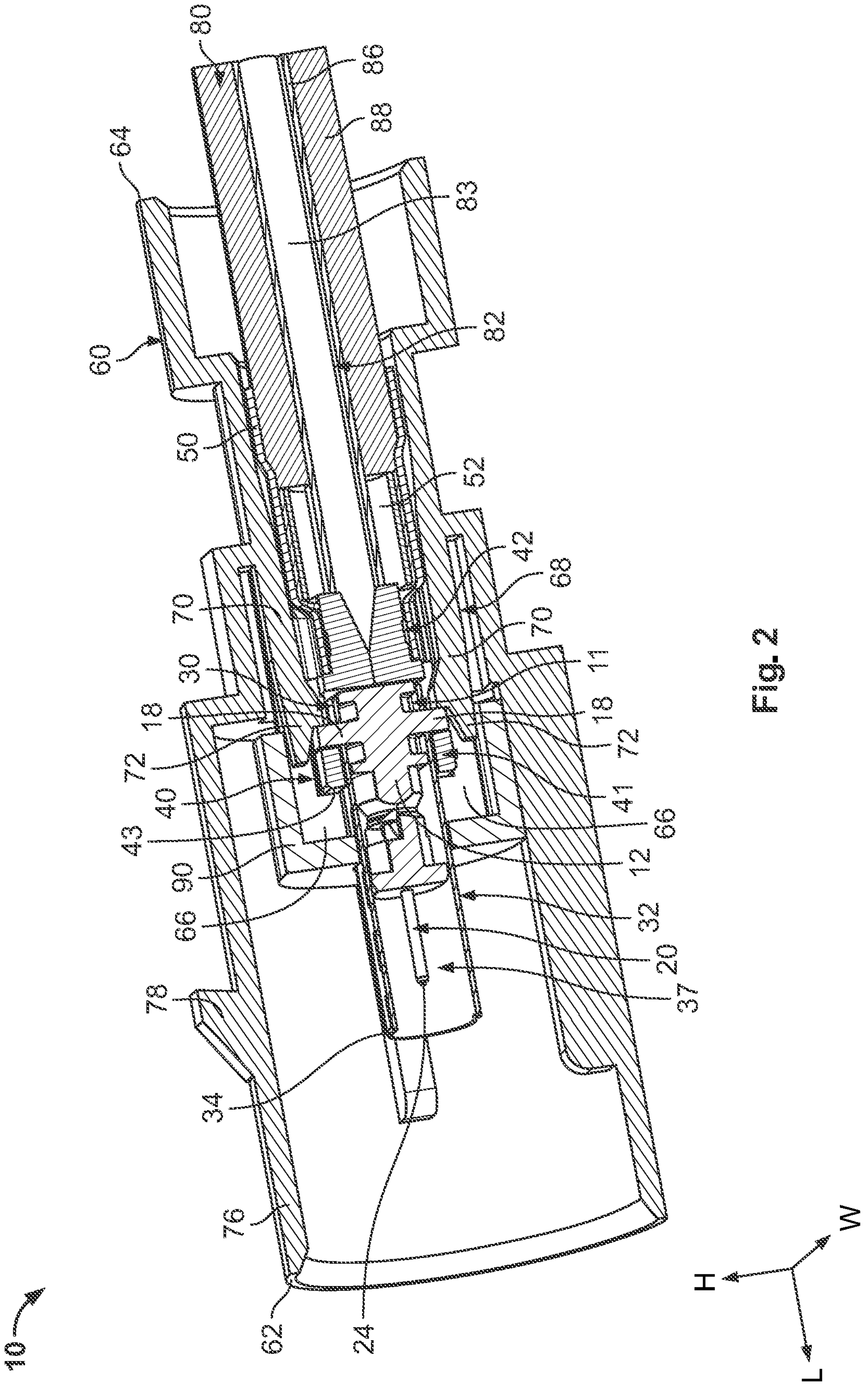
FIG. 2 is a sectional perspective view of a connector of the connector system.

The connector 10, as shown in FIG. 2, includes a dielectric 11, an inner contact 20 disposed in the dielectric 11, a shield 30 disposed around the dielectric 11, a housing 60 in which the dielectric 11 and the shield 30 are disposed, and a cable 80 connected to the dielectric 11 and the shield 30.

Figure 3:
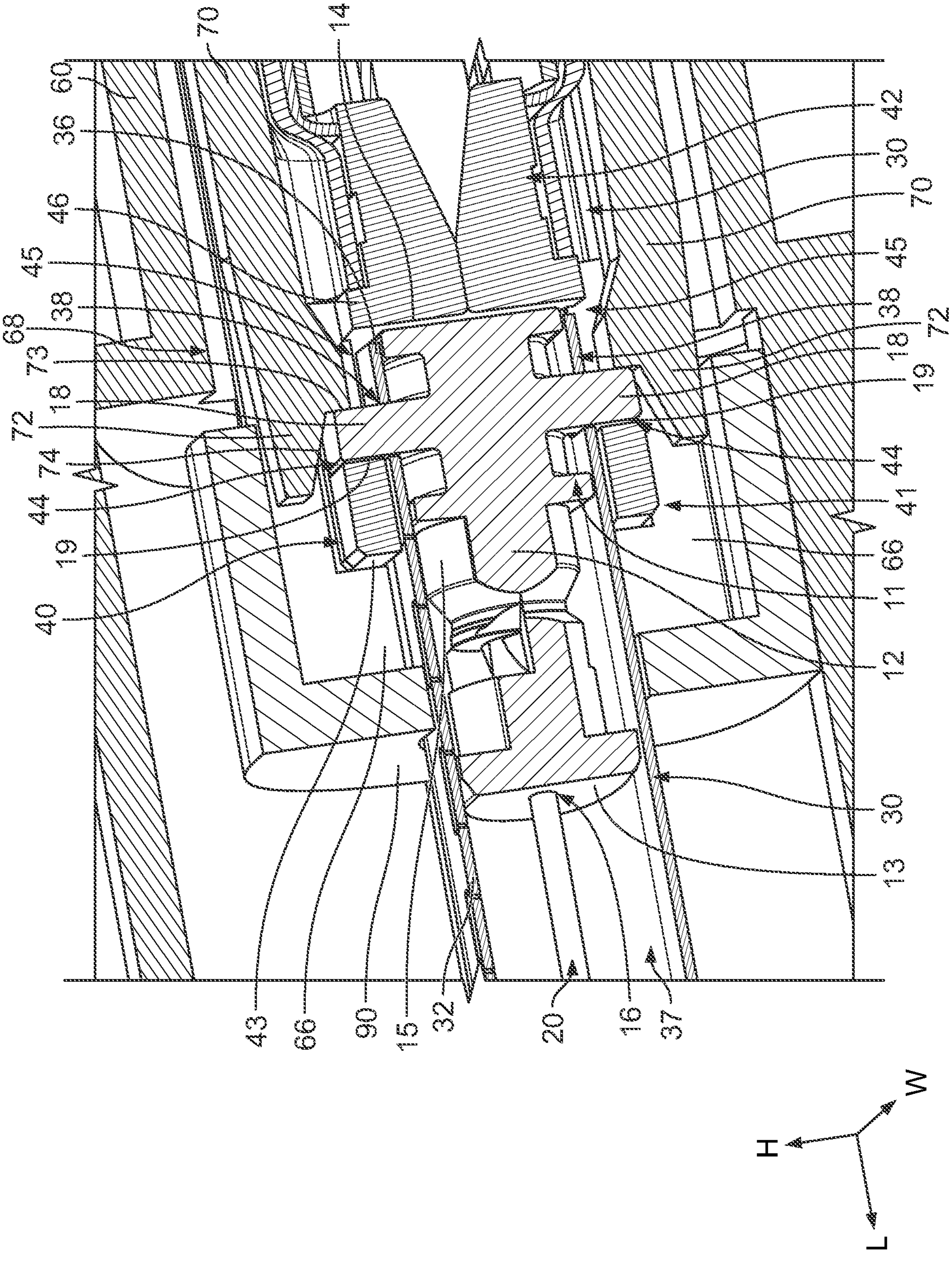
FIG. 3 is a detail view of a portion of FIG. 2.

As shown in FIGS. 2 and 3, the dielectric 11 has a body 12 and a latching feature 18 extending from the body 12. The body 12 has a first end 13 and a second end 14 opposite the first end 13 in a longitudinal direction L of the connector 10, as shown in greater detail in FIG. 3. The body 12 has an outer surface 15 and defines a contact passageway 16, shown in FIGS. 3 and 4, extending through the body 12 from the first end 13 to the second end 14 along the longitudinal direction L. In various embodiments, the body 12 may have one contact passageway 16, two contact passageways 16, or any number of contact passageways 16.

The latching feature 18, as shown in FIGS. 2 and 3, is a pair of flanges that protrude from opposite sides of the outer surface 15 of the body 12 in a height direction H perpendicular to the longitudinal direction L. The latching feature 18 is positioned closer to the second end 14 than to the first end 13 of the body 12 along the longitudinal direction L.

The dielectric 11 is formed of an electrically insulative material, such as a plastic. In the embodiment shown in FIGS. 2 and 3, the dielectric 11 is monolithically formed in a single piece with the body 12 and the latching feature 18. In another embodiment, the dielectric 11 may be formed of a plurality of pieces and assembled together to form the elements of the dielectric 11 described above.

Figure 4:
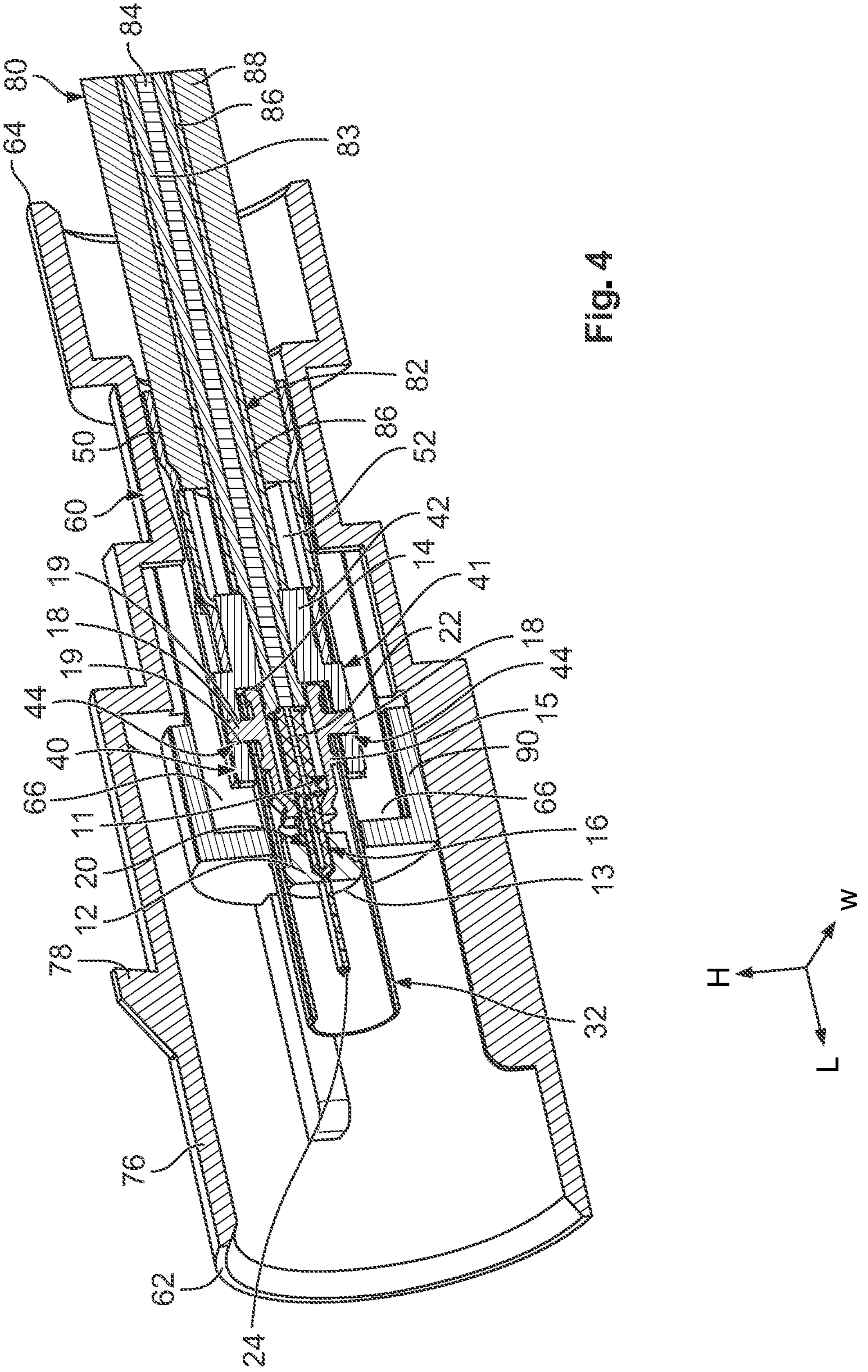
FIG. 4 is a sectional perspective view of the connector.

The inner contact 20, as shown in FIG. 4, has a connection end 22 and a mating end 24 opposite the connection end 22 in the longitudinal direction L. The inner contact 20 is formed of a conductive material and may be monolithically formed in a single piece or formed from a plurality of separate pieces assembled together. In the shown embodiment, the connection end 22 of the inner contact 20 is a crimp and the mating end 24 is a pin. In other embodiments, the mating end 24 may be a receptacle and the connection end 22 may be any type of element that can form a mechanical and electrical connection between the inner contact 20 and a conductor. The number of inner contacts 20 of the connector 10 corresponds to the number of contact passageways 16 in the dielectric 11.

The shield 30, as shown in FIG. 2, includes an outer contact 32, a die cast 40, an outer ferrule 50, and an inner ferrule 52.

The outer contact 32, shown in FIGS. 2 and 3, is formed of a conductive material, such as from a thin sheet of conductive material, and has a first end 34 and a second end 36 opposite the first end 34 in the longitudinal direction L. The outer contact 32 extends circumferentially around and defines a dielectric passageway 37 that extends between the first end 34 and the second end 36. The outer contact 32, as shown in greater detail in FIG. 3, has a pair of latching openings 38 extending through the outer contact 32 in the height direction H. The latching openings 38 are disposed opposite to each other in the height direction H in the shown embodiment. In other embodiments, the outer contact 32 may have a different number of latching openings 38, such as one latching opening 38 or three or more latching openings 38; the number of latching openings 38 corresponds to the number of flanges of the latching feature 18.

Figure 5:
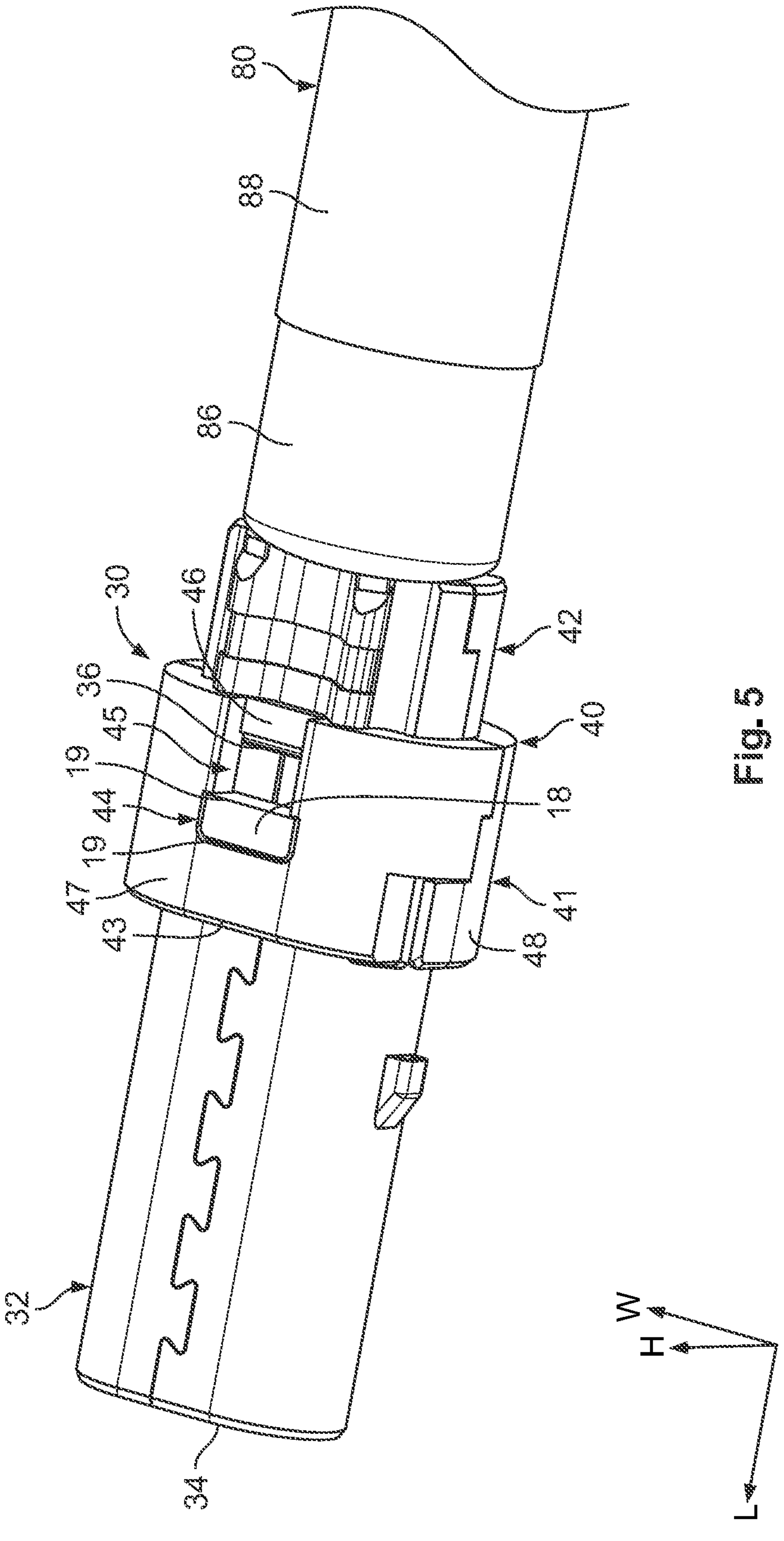
FIG. 5 is a perspective view of a cable and a shield of the connector.

The die cast 40, as shown in FIG. 5, has a first section 41 and a second section 42 extending from the first section 41 along the longitudinal direction L. The first section 41 has a leading end 43 in the longitudinal direction L and a flange 46 where the first section 41 meets the second section 42. The first section 41 has a latching passageway 44 extending through the first section 41 in the height direction H and spaced apart from the leading end 43 along the longitudinal direction L; the latching passageway 44 is also shown in FIGS. 3 and 4. The first section 41 has a recess 45, also shown in FIG. 3, between the flange 46 and a latching passageway 44. The recess 45 extends through the first section 41 in the height direction H. The recess 45 is adjacent to and communicates with the latching passageway 44. The second section 42 is a solid member extending from the flange 46 along the longitudinal direction L away from the first section 41.

As shown in the embodiment of FIG. 5, the die cast 40 is formed of a conductive material in a first part 47 and a second part 48 that oppose one another in the height direction H. Each of the first part 47 and the second part 48 has a portion of the first section 41 including the latching passageway 44 and the recess 45 and a portion of the second section 42 extending from the flange 46 of the first section 41. The first part 47 and the second part 48 are attachable together along the height direction H to form the die cast 40 shown in FIGS. 3-5 and described herein. In other embodiments, the die cast 40 may be formed from one or more than two pieces having the elements of the first section 41 and the second section 42 described herein.

The outer ferrule 50 and the inner ferrule 52 are each an approximately cylindrical element formed of a conductive material, as shown in FIGS. 2 and 4. The outer ferrule 50 and the inner ferrule 52 are each plastically deformable circumferentially to form a crimp connection, as described in greater detail below.

The housing 60, as shown in FIG. 2, has a mating end 62 and a cable end 64 opposite the mating end 62 along the longitudinal direction L. The housing 60 defines a receiving passageway 68 extending through the housing 60 from the mating end 62 to the cable end 64. In part of the housing 60, the housing 60 has an inner portion 66 and an outer portion 76 disposed around the inner portion 66. The outer portion 76 has a protrusion 78 extending from the housing 60.

As shown in FIGS. 2 and 3, the housing 60 has a pair of latches 70 extending into the receiving passageway 68. In the shown embodiment, the latches 70 extend along the inner portion 66. The latches 70 are each a cantilevered beam extending from the housing 60 to a free end 72 that is resiliently deflectable with respect to the housing 60. The free end 72, as shown in FIG. 3, has a first portion 73 and a second portion 74 extending at an angle from the first portion 73. The first portion 73 extends approximately in the height direction H and the second portion 74 extends at the angle in the height direction H and the longitudinal direction L. In the shown embodiment, the housing 60 has two latches 70 opposite one another in the height direction H. In another embodiment, the housing 60 could have one latch 70 or three or more latches 70; the number of latches 70 corresponds to the number of flanges of the latching feature 18.

The housing 60 is formed of an electrically insulative material, such as a plastic. In the embodiment shown, the housing 60 is monolithically formed in a single piece. In another embodiment, the housing 60 may be formed of a plurality of pieces and assembled together to form the elements of the housing 60 described above.

In the embodiment shown in FIGS. 2 and 4, the cable 80 is a shielded twisted pair cable and includes a pair of wires 82 each having a conductor 84 and an inner insulation 83 surrounding the conductor 84. The wires 82 extend next to one another and are surrounded by a braid 86, which is formed of a conductive material. The braid 86 is surrounded by an outer insulation 88. In other embodiments, the cable 80 could have a single wire 82 with a single conductor 84, or the cable 80 could be any other type of cable used in electrical connectors.

The assembly of the connector 10 will now be described in greater detail primarily with reference to FIGS. 2-4.

Each of the inner contacts 20 is positioned in one of the contact passageways 16, as shown in FIG. 4. The connection end 22 of the inner contact 20 is disposed within the body 12 in the contact passageway 16 and the mating end 24 of the inner contact 20 protrudes from the first end 13 of the body 12.

The cable 80 is connected to the inner contact 20 in the dielectric 11 as shown in FIGS. 2 and 4. The outer insulation 88 is stripped from an end of the cable 80 and the braid 86 is bent back from the wires 82. The wires 82 extend into the dielectric 11 and the conductor 84 of each of the wires 82 is mechanically and electrically connected to the connection end 22 of one of the inner contacts 20.

The shield 30 is disposed around the dielectric 11 and the cable 80. As shown in FIG. 2, the outer contact 32 of the shield 30 is disposed around the body 12 of the dielectric 11. The inner contacts 20 are electrically isolated from the outer contact 32 by the dielectric 11.

The latching feature 18 is positioned to extend through the shield 30. In the shown embodiment, each of the flanges of the latching feature 18 is positioned in and extends through one of the latching openings 38 in the outer contact 32. As shown in detail in FIG. 3, the latching opening 38 is sized to correspond to one of the flanges of the latching feature 18, and the latching feature 18 fits with minimal play in the latching openings 38. The outer contact 32 surrounds the latching feature 18 at the latching openings 38.

As shown in FIGS. 2-4, the first section 41 of the die cast 40 is disposed around the outer contact 32. The second end 36 of the outer contact 32 and the second end 14 of the body 12 of the dielectric 11 abut against the flange 46 of the die cast 40.

The latching feature 18 that protrudes through the latching openings 38 of the outer contact 32 extends into the latching passageways 44 in the first section 41 of the die cast 40. The first section 41 of the die cast 40, as shown in FIGS. 4 and 5, abuts the latching feature 18 on each of a pair of opposite sides 19 of the latching feature 18 along the longitudinal direction L; the recess 45 is narrower than the latching passageway 44 in a width direction W perpendicular to the longitudinal direction L and the height direction H, such that a portion of the first section 41 abuts each of the sides 19 of the latching feature 18. The latching feature 18 forms a secure connection between the dielectric 11, the outer contact 32, and the die cast 40 with minimal movement between the parts.

As shown in FIGS. 2 and 4, the wires 82 extend through the second section 42 of the die cast 40 into the dielectric 11. The inner ferrule 52 is disposed around the braid 86 adjacent to the second section 42, and the braid 86 is bent back over the inner ferrule 52. The outer ferrule 50 of positioned over the outer insulation 88 of the cable 80, over the inner ferrule 52, and over the second section 42 of the die cast 40. The outer ferrule 50 is crimped in the position shown in FIG. 2 to secure the cable 80 and the inner ferrule 52 to the die cast 40.

The outer contact 32, the die cast 40, the ferrules 50, 52, and the braid 86 are electrically connected to form the shield 30. The shield 30 is electrically insulated from the inner contact 20 and the conductor 84 of the wire 82 and provides electromagnetic shielding for the inner contact 20 and the conductor 84.

The dielectric 11 assembled with the shield 30 and the cable 80 is inserted into the receiving passageway 68 of the housing 60 along the longitudinal direction L. As the assembly is inserted, the leading end 43 of the die cast 40 abuts the free ends 72 of the latches 70 and deflects the latches 70 away from each other. When the dielectric 11 reaches the position shown in FIGS. 2 and 3, in which the leading end 43 of the die cast 40 abuts or bottoms on the inner portion 66 of the housing 60 along the longitudinal direction L, the latches 70 resiliently return to a latched position shown in FIGS. 2 and 3.

As shown in the latched position of FIGS. 2 and 3, the free end 72 of each of the latches 70 engages the latching feature 18 of the dielectric 11 to secure the dielectric 11 and the shield 30 connected to the dielectric 11 in the receiving passageway 68 of the housing 60. The free end 72 of each of the latches 70 is positioned in one of the recesses 45 of the first section 41 in engagement with the latching feature 18. The first portion 73 of the free end 72 abuts the latching feature 18 along the longitudinal direction L. The second portion 74 extending at an angle from the first portion 73 is aligned with the latching feature 18 in the height direction H.

With the latches 70 engaging the dielectric 11 in the latched position, a cap 90 shown in FIGS. 2-4 can be positioned over the inner portion 66 of the housing 60 in the receiving passageway 68. The cap 90 is formed of an insulative material and is an approximately cylindrical member that fits over the outer contact 32 exposed beyond the inner portion 66 of the housing 60. The cap 90, as shown in detail in FIG. 3, is positioned around the free ends 72 of the latches 70 and limits deflection of the free ends 72 away from the latching feature 18 to prevent unintended disconnection of the dielectric 11 from the latches 70.

Figure 6:
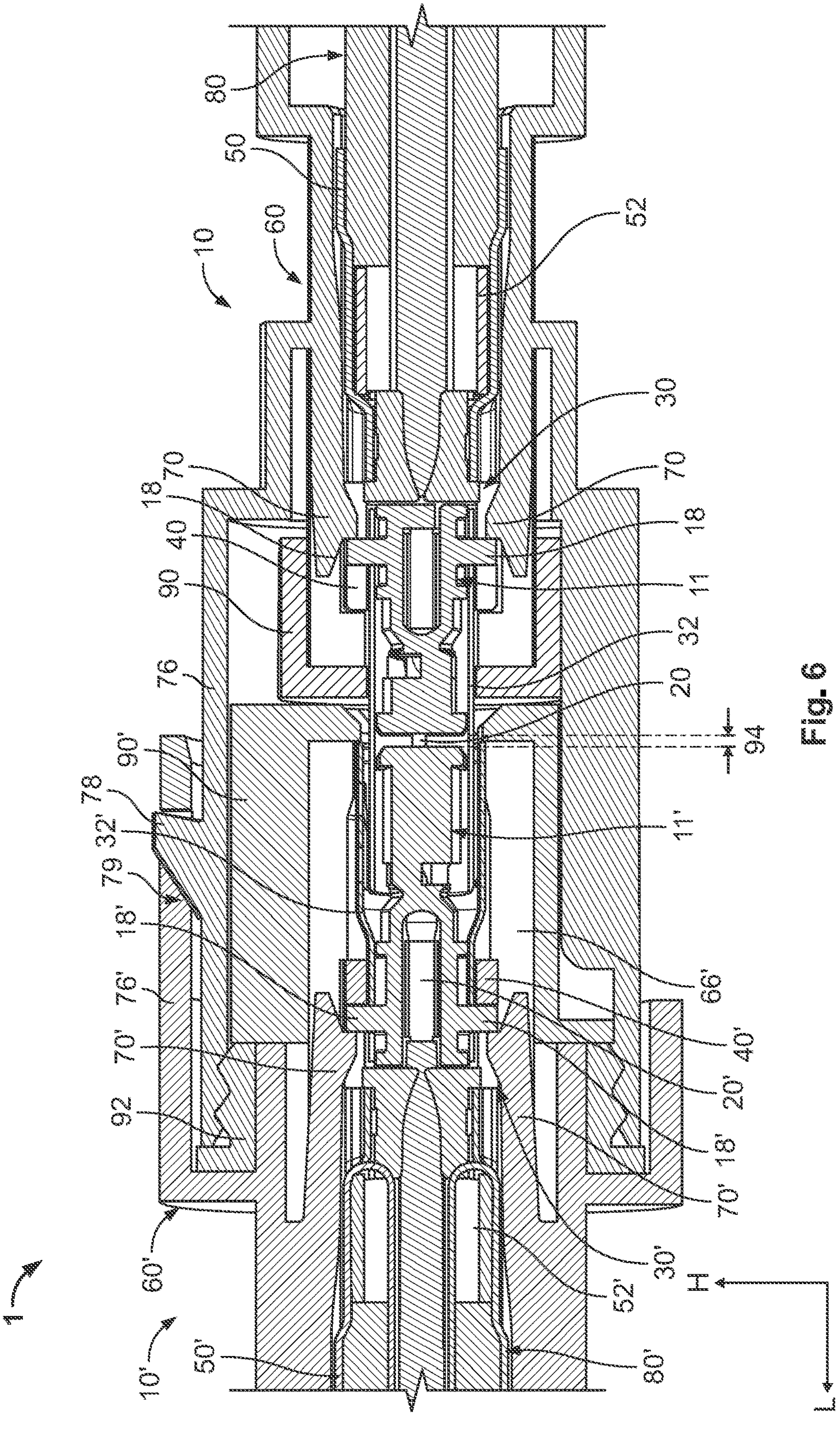
FIG. 6 is a sectional side view of the connector system.

In the connector system 1, the mating connector 10', shown in FIGS. 1 and 6, includes the same elements as the connector 10 described in detail above. Like reference numbers will be used for elements of the mating connector 10' that correspond to elements of the connector 10, with the elements of the mating connector 10' having an added apostrophe for differentiation. Corresponding elements of the mating connector 10' will also be referred to with the same terms as used to describe the connector 10, but with the prefix "mating" added. For clarity, all elements of the mating connector 10' that have like reference numbers to the connector 10 have the same corresponding description as the connector 10 unless otherwise described below.

The mating connector 10', as shown in FIG. 6, includes a mating dielectric 11, a mating inner contact 20' disposed in the mating dielectric 11', a mating shield 30' disposed around the mating dielectric 11', a mating housing 60' in which the mating dielectric 11' and the mating shield 30' are disposed, and a mating cable 80' connected to the mating dielectric 11' and the mating shield 30'. The mating inner contact 20' in the shown embodiment is a receptacle, but could be a pin or any other type of contact that is matable with the inner contact 20. The mating shield 30' includes a mating outer contact 32', a mating die cast 40', a mating outer ferrule 50', and a mating inner ferrule 52'.

As shown in FIG. 6, the mating housing 60' has a mating latch 70' and the mating dielectric 11' has a mating latching feature 18' extending through the mating outer contact 32' of the mating shield 30'. As similarly described with respect to the connector 10, the mating latch 70' engages the mating latching feature 18' to secure the mating dielectric 11' and the mating shield 30' connected to the mating dielectric 11' in the mating housing 60'.

When the connector 10 is mated with the mating connector 10' in a mated position shown in FIGS. 1 and 6, the inner contact 20 electrically connects with the mating inner contact 20' to electrically connect the cable 80 and the mating cable 80' and the shield 30 electrically connects with the mating shield 30'. The outer portion 76 of the housing 60 is received in the mating outer portion 76' of the mating housing 60' and abuts a seal 92 disposed in the mating housing 60' between a mating inner portion 66' and a mating outer portion 76' of the mating housing 60'. The seal 92 may be formed of an elastomeric, elastically compressible material and is compressed in the mated position to seal an interior of the connector system 1 from the environment.

In the mated position, the protrusion 78 of the outer portion 76 of the housing 60 engages with a housing recess 79 of the mating outer portion 76' of the mating housing 60', as shown in FIGS. 1 and 6, to releasably secure a connection between the connectors 10, 10'. In the mated position, the mating dielectric 11' is separated from the dielectric 11 by a mating gap 94. A size of the mating gap 94 is dictated by engagement of the latch 70 with the latching feature 18 and engagement of the mating latch 70' with the mating latching feature 18'.

Figure 7:
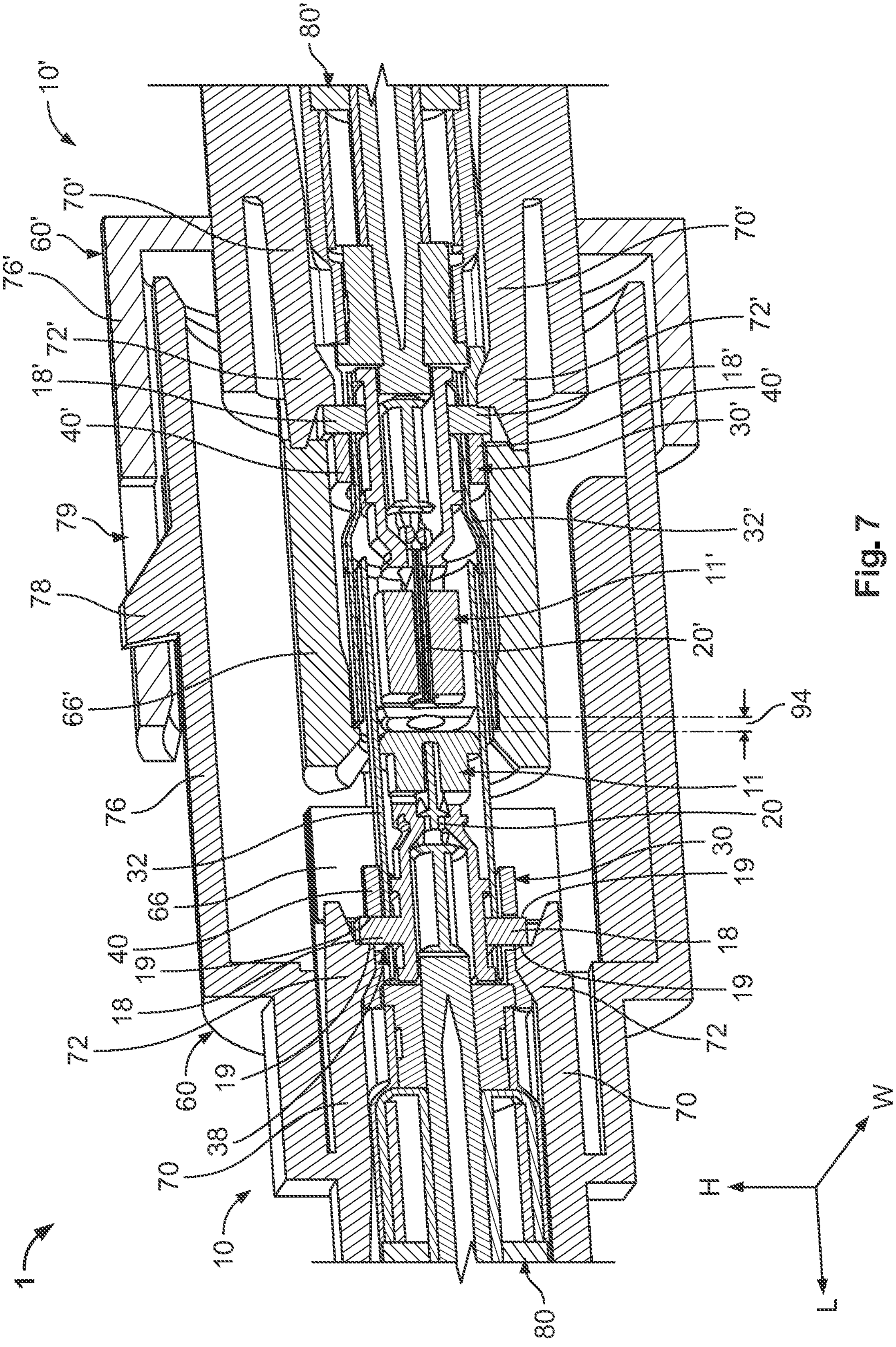
FIG. 7 is a sectional perspective view of a connector system according to another embodiment.

A connector system 1 according to another embodiment is shown in FIG. 7. Like reference numbers refer to like elements and primarily the differences from the embodiment shown in FIGS. 1-6 will be described in detail herein.

In the embodiment shown in FIG. 7, the latching feature 18 that protrudes through the latching openings 38 in the outer contact 32 and into the latching passageways 44 of the die cast 40 also protrudes beyond the die cast 40 in the height direction H. The free end 72 of the latch 70 engages one of the sides 19 of the latching feature 18 and, in this embodiment, the opposite side 19 of the latching feature 18 abuts the inner portion 66 of the housing 60 along the longitudinal direction L. In this embodiment, when the dielectric 11 with the shield 30 attached to the dielectric 11 is inserted into the housing 60, the latching feature 18 of the dielectric 11 abuts or bottoms on the inner portion 66 of the housing 60 when the latches 70 resiliently return to the latched position shown in FIG. 7.

The mating connector 10' shown in FIG. 7 has the same features and, when the mating connector 10' is mated with the connector 10 to form the connector system 1, the mating gap 94 is dictated by the bottoming of the dielectrics 11, 11' on the housings 60, 60' and the engagement of the latches 70, 70' with the respective latching features 18, 18'.

In the connector 10 according to the embodiments of the present invention, the latch 70 bears directly on the latching feature 18 of the dielectric 11 that extends through the shield 30. Securing directly to the dielectric 11 reduces positional tolerance stacking and allows for a more precise control of the mating gap 94 in the connector system 1, which improves signal integrity. The direct bearing of the latch 70 on the dielectric 11 also provides a stronger resistance to pull out forces by bypassing the shield 30.

What is claimed is:

1. A connector, comprising:

a dielectric having a body and a latching feature extending from the body;

a shield disposed around the body of the dielectric, the latching feature extends through the shield; and a housing having a receiving passageway and a latch extending into the receiving passageway, the latch engages the latching feature of the dielectric to secure the dielectric and the shield in the receiving passageway of the housing.

2. The connector of claim 1, wherein the shield includes an outer contact disposed around the body of the dielectric, the outer contact has a latching opening extending through the outer contact, the latching feature is positioned in the latching opening.

3. The connector of claim 2, wherein the outer contact surrounds the latching feature at the latching opening.

4. The connector of claim 2, wherein the shield includes a die cast having a first section disposed around the outer contact, the first section has a latching passageway, the latching feature extends into the latching passageway.

5. The connector of claim 4, wherein the first section of the die cast abuts the latching feature on each of a pair of opposite sides of the latching feature along a longitudinal direction of the connector.

6. The connector of claim 5, wherein the first section of the die cast has a leading end abutting the housing along the longitudinal direction.

7. The connector of claim 4, wherein the die cast has a recess adjacent to the latching passageway, the latch of the housing is positioned in the recess in engagement with the latching feature.

8. The connector of claim 7, wherein a side of the latching feature opposite the latch abuts the housing along a longitudinal direction of the connector.

9. The connector of claim 4, further comprising a cable having at least one wire and a braid surrounding the at least one wire, the braid is electrically connected to the die cast and the outer contact.

10. The connector of claim 9, wherein the at least one wire extends through the die cast and into the dielectric, the at least one wire includes a conductor and an inner insulation disposed around the conductor.

11. The connector of claim 10, further comprising an inner contact disposed in the body of the dielectric and electrically isolated from the outer contact by the dielectric, the inner contact is mechanically and electrically connected to the conductor of the at least one wire.

12. The connector of claim 9, wherein the shield includes an inner ferrule disposed around the braid and an outer ferrule disposed around a second section of the die cast and an outer insulation of the cable.

13. The connector of claim 1, wherein the latch is a cantilevered beam having a free end engaging the latching feature.

14. The connector of claim 13, wherein the free end has a first portion abutting the latching feature along a longitudinal direction of the connector.

15. The connector of claim 14, wherein the free end has a second portion extending at an angle from the first portion, the second portion is aligned with the latching feature in a height direction perpendicular to the longitudinal direction.

16. The connector of claim 13, further comprising a cap disposed in the receiving passageway and limiting deflection of the free end of the latch away from the latching feature.

17. A connector system, comprising:

a connector including a dielectric having a body and a latching feature extending from the body, a shield disposed around the body of the dielectric, and a housing having a receiving passageway and a latch extending into the receiving passageway, the latching feature extends through the shield, the latch engages the latching feature of the dielectric to secure the dielectric and the shield in the receiving passageway of the housing; and a mating connector matable with the connector.

18. The connector system of claim 17, wherein the mating connector has a mating dielectric, a mating shield disposed around the mating dielectric, and a mating housing with a mating latch, the mating dielectric has a mating latching feature extending through the mating shield and the mating latch engages the mating latching feature.

19. The connector system of claim 18, wherein the mating dielectric is separated from the dielectric by a mating gap in a mated position of the connector and the mating connector, the mating gap is dictated by engagement of the latch with the latching feature and the mating latch with the mating latching feature.

20. The connector system of claim 19, wherein the housing releasably engages the mating housing and the shield is electrically connected with the mating shield in the mated position.

* * * * *